US007804735B2

(12) United States Patent
Mao et al.

(10) Patent No.: US 7,804,735 B2
(45) Date of Patent: Sep. 28, 2010

(54) DUAL CHANNEL MEMORY ARCHITECTURE HAVING A REDUCED INTERFACE PIN REQUIREMENTS USING A DOUBLE DATA RATE SCHEME FOR THE ADDRESS/CONTROL SIGNALS

(75) Inventors: Jian Mao, San Diego, CA (US); Raghu Sankuratri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 12/039,908

(22) Filed: Feb. 29, 2008

(65) Prior Publication Data

US 2009/0219779 A1 Sep. 3, 2009

(51) Int. Cl.
*G11C 8/00* (2006.01)
(52) U.S. Cl. ............... 365/233.13; 365/63; 365/230.03; 365/233.1
(58) Field of Classification Search ............ 365/63, 365/233.1, 233.13, 230.03
See application file for complete search history.

(56) References Cited

U.S. PATENT DOCUMENTS

| | | | |
|---|---|---|---|
| 6,314,046 B1 | 11/2001 | Kamiya et al. | |
| 7,003,684 B2 | 2/2006 | Chang | |
| 7,023,719 B1 * | 4/2006 | Hung et al. | 365/63 |
| 7,171,529 B2 | 1/2007 | Ajiro | |
| 2006/0129776 A1 * | 6/2006 | Ware et al. | 711/167 |

FOREIGN PATENT DOCUMENTS

| | | |
|---|---|---|
| GB | 2337618 | 11/1999 |
| WO | 05083572 | 9/2005 |

OTHER PUBLICATIONS

International Search Report-PCT/US09/033018, International Search Authority-European Patent-Jun. 15, 2009.
Written Opinion-PCT/US09/033018, International Search Authority-European Patent-Jun. 15, 2009.

* cited by examiner

*Primary Examiner*—Hoai V Ho
(74) *Attorney, Agent, or Firm*—Peter M. Kamarchik; Nicholas J. Pauley; Sam Talpalatsky (57) ABSTRACT

Apparatuses and methods for dual channel memory architecture with reduced interface pin requirements are presented. One memory architecture includes a memory controller, a first memory device coupled to the memory controller by a shared address bus and a first clock signal, and a second memory device coupled to the memory controller by the shared address bus and a second clock signal, where the polarity of the second clock signal is opposite of the first clock signal. A method for performing data transactions is presented. The method includes providing addressing signals over a shared address bus to a first memory device and a second memory device, providing clock signals to the memory devices which are reversed in polarity, where the clock signals are derived from a common clock signal, and transferring data to the memory devices over separate narrow data buses in an alternating manner based upon the clock signals.

25 Claims, 7 Drawing Sheets

DUAL CHANNEL MEMORY ARCHITECTURE HAVING A REDUCED INTERFACE PIN REQUIREMENTS USING A DOUBLE DATA RATE SCHEME FOR THE ADDRESS/CONTROL SIGNALS

FIELD OF DISCLOSURE

The embodiments of the disclosure relate generally to memory architectures, and more specifically, to dual data channel memory architecture circuits having reduced interface pin requirements.

BACKGROUND

In some applications, processors may have a large percentage of memory access operations which transfer small amounts of data. Such memory access operations may be commonly known as burst length access (e.g., burst length reads and/or burst length writes). Current research suggests that for small burst length access, multiple narrow independent data channels accessing the memory devices may provide better performance than a single data channel having a wide memory interface. Accordingly, existing systems having single, wide-channel memory interface could benefit by increasing the number of data channels while reducing each data channel's bit width.

However, upgrading an existing processing system having a single data channel memory interface to one having dual memory interface may present some design challenges. For example, conventional memory interfaces using dual channels may have more complex circuitry associated with the addressing and/or control channels. This can lead to more complex packaging and circuit board designs, thus increasing the number of interface pins, circuit traces, etc. Such effects can have an adverse impact on cost and increase design risk. Moreover, such redesigns prevent any type of backwards compatibility with existing components and/or other existing sub-systems.

Accordingly, there is a need for a memory architecture having a dual narrow-channel interface which can utilize the existing pins meant for a wide channel interface. The resulting memory architecture may be implemented without impacting system cost resulting from an increased pin count.

SUMMARY

Apparatuses and methods for dual channel memory architectures with reduced interface pin requirements are presented below.

In one embodiment, the memory architecture includes a memory controller, a first memory device coupled to the memory controller by a shared address bus and a first clock signal. The memory architecture further includes a second memory device coupled to the memory controller by the shared address bus and a second clock signal, wherein the polarity of the second clock signal is opposite of the polarity of the first clock signal.

In another embodiment, a method for performing data transactions is presented. The method includes providing addressing signals over a shared address bus to a first memory device and a second memory device, providing clock signals to the memory devices which are reversed in polarity, wherein the clock signals are derived from a common clock signal, and transferring data to the memory devices over separate narrow data buses in an alternating manner based upon the clock signals.

In yet another embodiment, a memory architecture may include a memory controller, a first memory device coupled to the memory controller by a shared control bus and a first clock signal, and a second memory device coupled to the memory controller by the shared control bus and a second clock signal, wherein the polarity of the second clock signal is opposite of the polarity of the first clock signal.

Another embodiment of the invention a memory architecture may include a memory controller, a first memory device coupled to the memory controller by a shared control bus and a first clock signal, and a second memory device coupled to the memory controller by the shared control bus and a second clock signal, wherein the polarity of the second clock signal is opposite of the polarity of the first clock signal.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

As used herein, the term double data rate (DDR) memory may refer a wide variety of different memory device standards known in the art, and may include, for example, the following types of memory devices: Low Power Double Data Rate (LPDDR), standard DDR, DDR2, etc.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
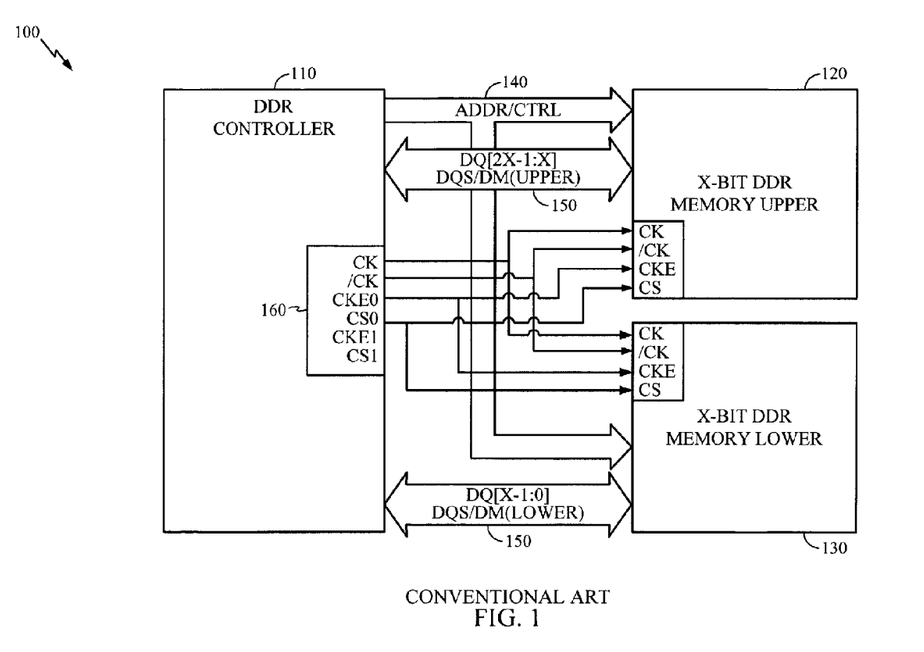
FIG. 1 shows a block diagram of a conventional single wide-channel double data rate memory (DDR) architecture using two narrow-channel DDR memories.

FIG. 1 shows a block diagram of a conventional single wide-channel double data rate memory (DDR) architecture 100. The memory architecture 100 may include a DDR Controller 110, a X-bit DDR memory device 120, a second X-bit DDR memory device 130, an address/control (ADDR/CTRL) bus 140, and a wide data bus 150 comprising upper and lower buses. As used herein, the term X denotes a number of bits which may be simultaneously transferred though a data bus (i.e., which may also be referred to as the bus width). The variable "X" may represent any number of bits, such as, for example, 4, 8, 16, 32, or higher. The term "2X-bit" is used herein to denote an exemplary wide data bus having a bus width twice that of the narrow bus width. However, the "2X" multiplier should not be considered restrictive, and various embodiments invention may utilize other multipliers. Moreover, the ratio between the respective widths of the wide and narrow buses may not be restricted to an integer (i.e., the wide bus may larger than the narrow bus by any number of bits).

The wide data bus 150 may be used to transfer data between the DDR controller 110 and each of the X-bit memory devices 120, 130. The wide data bus 150 may transfer data using 2X separate lines DQ[2X–1:X] and DQ[X–1:0], and may do so in a parallel manner. The wide data bus 150 may also have dedicated lines which carry a Data Strobe signal (DQS) and a Data Mask. The DQS may be used for capturing the data. The DM signal may be used for indicating the valid data bytes. While the names of these signals may vary depending upon which DDR specification is being referenced, the signals used in various other DDR specifications may basically perform similar functions.

In order to properly address memory within the X-bit DDR memory devices 120, 130, the ADDR/CTRL bus 140 may be used to provide addressing and/or control information from the DDR controller 110 to the memory devices 120, 130. Typically, during a single write operation, data may be written into a DDR device by supplying a single address over the ADDR/CTRL bus 140, and shortly thereafter supplying a plurality of data words over data bus 150. Specifically, the ADDR/CTRL bus 140 may include dedicated lines for carrying the following signals: A[n:0], BA[m:0], /RAS, /CAS, and/or /WE, where "m" and "n" are row and column address values which may depend upon the memory device specification. As mentioned above, when the number of words are low (i.e., during burst writes), the single wide-channel DDR memory architecture 100 may not be as efficient as systems using dual channel DDR data buses, which will be discussed in the explanations of the subsequent Figures below.

DDR controller 110 may also provide a number of other clock and associated control signals to each memory device 120, 130. For example, the DDR controller 150 may provide differential clock signals CK and /CK to each memory device. As defined herein, the /CK clock signal may be an inverted version of the CK clock signal. The DDR controller 110 may also provide a first clock enable (CKE0), and first chip select (CS0) to DDR memory device 120, and a second clock enable signal (CKE1) and a second chip select signal (CS1) to DDR memory device 130. The differential clock signals may determine the speed at which memory is transferred between the DDR controller 110 and the memory devices 120, 130. The chip select signals may tell the memory devices 120, 130 when to accept/provide data to the DDR controller 110 over data bus 150. Note that in this configuration, chip-select (CS1) and clock enable (CKE1) may be unused.

The DDR controller 110 may also be coupled to one or more processing devices (not shown) which in turn transfer data over separate data buses. Such processing devices may include, but are not limited to, microprocessors, microcontrollers, digital signal processors, and may further include any combinations thereof.

Applications of the single wide-channel (DDR) architecture 100 may typically include portable devices, such as, for example, mobile access terminals, personal digital assistants, digital video/music players, etc.

Figure 2:
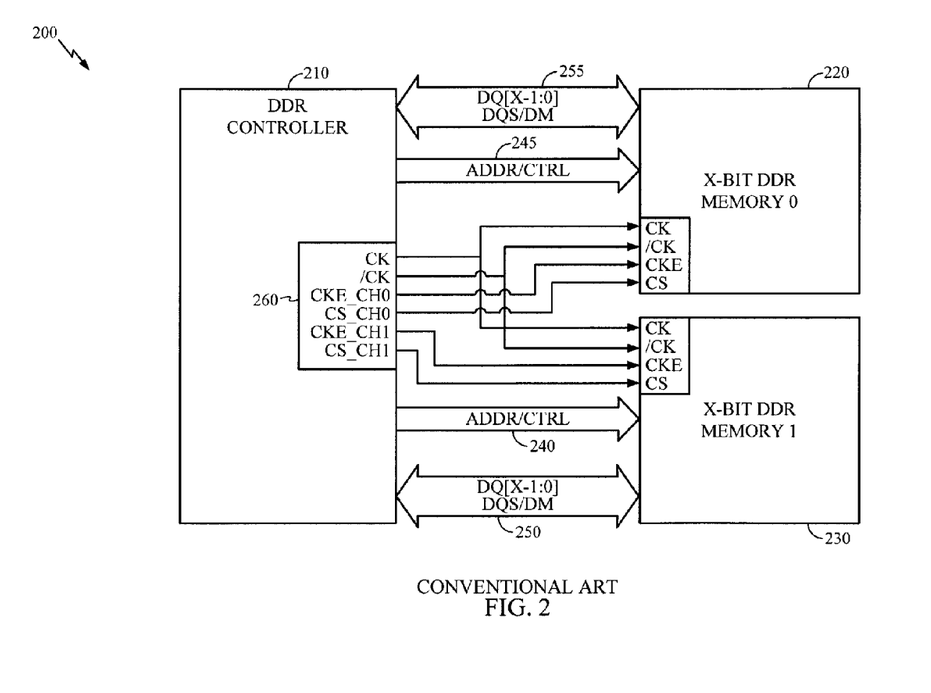
FIG. 2 shows a block diagram of a conventional dual narrow-channel DDR memory architecture.

FIG. 2 shows a block diagram of a conventional dual narrow-channel DDR memory architecture 200. The memory architecture 200 may include a DDR Controller 210, an X-bit DDR memory device 220, a second X-bit DDR memory device 230, a first address/control (ADDR/CTRL) bus 240, a second address/control (ADDR/CTRL) bus 245, a first narrow data bus 250, and a second data bus 255. The term "X-bit" is used herein to denote a data bus having a narrow bus width.

In DDR memory architecture 200, the two narrow data buses 250 and 255 may be used to transfer data between the DDR controller 210 and each of the X-bit memory devices 220 and 230. The narrow bus 250 may be dedicated to reading/writing data to/from X-bit DDR memory device 230, and the narrow bus 255 may be dedicated to reading/writing data to/from X-bit DDR memory device 220. Each narrow data bus 250, 255 may transfer data using X separate lines DQ[X–1:0] in a parallel manner. Each narrow data bus 250, 255 may each also have dedicated lines which carry a Data Strobe signal (DQS) and a Data Mask.

When the data transfers across data buses 250, 255 have low burst length (i.e., during burst read/writes), the dual narrow-channel DDR memory architecture 200 will be more efficient than the memory architecture 100 described above in FIG. 1.

In order to properly address memory within the X-bit DDR memory devices 220, 230, the two separate ADDR/CTRL buses 240, 250 may be used to provide addressing and/or control information from the DDR controller 210 to the memory devices 220, 230. The ADDR/CTRL bus 240 may be dedicated to providing control signals to X-bit DDR memory device 230, and ADDR/CTRL buses 245 may be dedicated to providing control signals to X-bit DDR memory device 220. Specifically, the ADDR/CTRL bus 240, 245 may each include dedicated lines for carrying the following signals: A[n:0], BA[m:0], /RAS, /CAS, and/or /WE.

DDR controller 210 may also provide a number of other clock and associated control signals to each memory device 220, 230. For example, the DDR controller 210 may provide differential clock signals CK and /CK to each memory device.

The differential clock signals may determine the speed at which memory is transferred between the DDR controller 210 and the memory devices 220, 230. The DDR controller 210 may also provide a Channel 0 clock enable (CKE_CH0), and Channel 0 chip select (CS_CH0) to DDR memory device 220, and a second clock enable signal (CKE_CH1) and a second chip select signal (CS_CH1) to DDR memory device 230. The chip select signals may tell the memory devices 220, 230 when to accept/provide data to the DDR controller 210 over the respective narrow data buses 250 and 255.

The DDR controller 210 may also be coupled to one or more processing devices (not shown). Because the dual data bus structure 200 provides more opportunities for concurrently running separate processes to transfer data, DDR memory architecture 200 is more efficient when the DDR controller 210 serves more than one processor.

However, one drawback of the dual narrow-channel DDR memory architecture 200 lies in the additional circuit complexity required fro the duplication of the ADDR/CTRL bus. For example, when X=16 bits and 2X=32 bits, the pin count of memory architecture 200 increases approximately 30% over the pin count of the single channel memory architecture 100. The increased pin count creates incompatibilities with typical single channel designs and increases the cost of design and implementation.

Figure 3:
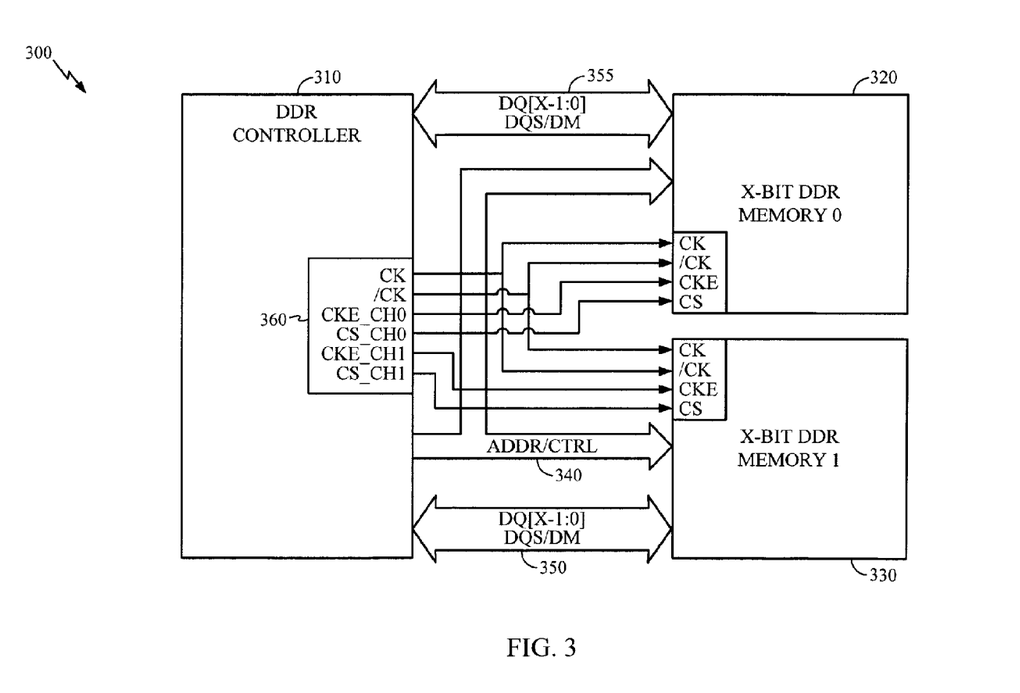
FIG. 3 shows a block diagram of a dual narrow-channel DDR memory architecture.

FIG. 3 shows a block diagram of a dual narrow-channel DDR memory architecture 300 consistent with an embodiment of the invention. The memory architecture 300 may include a DDR Controller 310, a first X-bit DDR memory device 320, a second X-bit DDR memory device 330, a shared address/control (ADDR/CTRL) bus 340, a first narrow data bus 350, and a second narrow data bus 355.

With DDR memory architecture 300, the two narrow data buses 350 and 355 may be used to transfer data between the DDR controller 310 and each of the X-bit memory devices 320 and 330. The narrow bus 350 may be dedicated to reading/writing data to/from X-bit DDR memory device 330, and the narrow bus 355 may be dedicated to reading/writing data to/from X-bit DDR memory device 320. Each narrow data bus 350, 355 may transfer data using X separate lines DQ[X−1:0] in a parallel manner. Each narrow data bus 350, 355 may each also have dedicated lines which carry a Data Strobe signal (DQS) and a Data Mask. In various embodiments of the invention, the two narrow data buses 350 and 355 may be implemented using a single wide bus. For example, two 16-bit buses may be realized by splitting a 32-bit data bus.

In order to properly address memory within the X-bit DDR memory devices 320, 330, the shared ADDR/CTRL bus 340 may be used to provide addressing and/or control information from the DDR controller 310 to the memory devices 320, 330. Specifically, the ADDR/CTRL bus 340 may be an address bus and/or a control bus. When both address and control buses are being utilized, the buses may be separate or they may be combined. Embodiments may include architectures having a separate control bus and a shared address bus, and architectures where both the control bus and address bus are shared. Because the shared ADDR/CTRL bus is shared between the memory devices 320, 330, it may update addressing information in each memory device on alternate clock cycles. The address bus may include dedicated lines for carrying the following addressing signals and bank addressing signals: A[n:0] and BA[m:0]. In various embodiments, the address bus may have a combined bus width of 16-bits. The control bus may include the following control signals: /RAS, /CAS, and/or /WE.

The dual narrow-channel DDR memory architecture 300 shares the efficiency advantages of the conventional dual narrow-channel DDR memory architecture 200 during burst access reads and writes to memory devices 320, 330. However, because DDR memory architecture 300 only has one shared ADDR/CTRL bus 340, the interface pin counts may be reduced which results in reduced routing on the board and hence reduced complexity.

DDR controller 310 also provides a number clock signals to each memory device 320, 330, but does so in a different manner than conventional DDR architecture 200. While DDR controller 310 provides differential clock signals CK and /CK to each memory device, it reverses polarity of the clock signals between the two memory devices 320 and 330. For example, as shown in FIG. 3, DDR controller 310 provides the CK signal to the CK input and the /CK signal to the /CK input for DDR memory device 320. However, this arrangement is reversed for DDR memory 330. The DDR controller 310 provides the CK signal to the /CK input at DDR memory 330, and the /CK clock signal to the CK input at DDR memory 330. This arrangement permits alternating data transfers between the DDR controller 310 and the memory devices 320, 330 which occur on both the rising and falling edge of clock signal CK. Various other embodiments of the invention are not limited to using differential signals for CK and /CK. The clock signal CK and /CK have reversed polarity, so the memory devices may be read in an alternate manner. Therefore, the clock signals CK and /CK may be generated accordingly using any conventional technique. For example, clock signal CK may be generated in any conventional manner, and clock signal /CK may be provided by driving clock signal CK through an inverter to reverse its polarity.

The DDR controller 310 may also provide a first clock enable (CKE_CH0), and first chip select (CS_CH0) to DDR memory device 320, and a second clock enable signal (CKE_CH1) and a second chip select signal (CS_CH1) to DDR memory device 330. As before, the differential clock signals may determine the speed at which memory is transferred between the DDR controller 360 and the memory devices 320, 330. The chip select signals may tell the memory devices 320, 330 when to accept/provide data to the DDR controller 310 over first data bus 350 and second data bus 355. In the embodiment shown in FIG. 3, the implementation of the DDR controller 310 may differ from conventional designs single channel designs as two DDR data channels are being utilized. Various approaches for modifying conventional DDR controllers may be undertaken. Two exemplary implementations of DDR controllers are presented below in FIGS. 5A-5B.

By using the shared ADDR/CTRL bus 340 and sharing addressing signals across the two DDR data channels, the DDR controller 310 has the advantage of efficient burst access operation like the traditional dual channel DDR controller 210. However, the shared ADDR/CTRL bus consolidates the number of pins used to interface the DDR controller to the memory devices. This approach may obviate the need for adding additional pins and retain backward compatibility with existing single data channel hardware. Therefore, the architecture 300 use is advantageous for use in mobile access terminals and other portable devices having embedded processors/controllers accessing low power random access memory (RAM).

Figure 4:
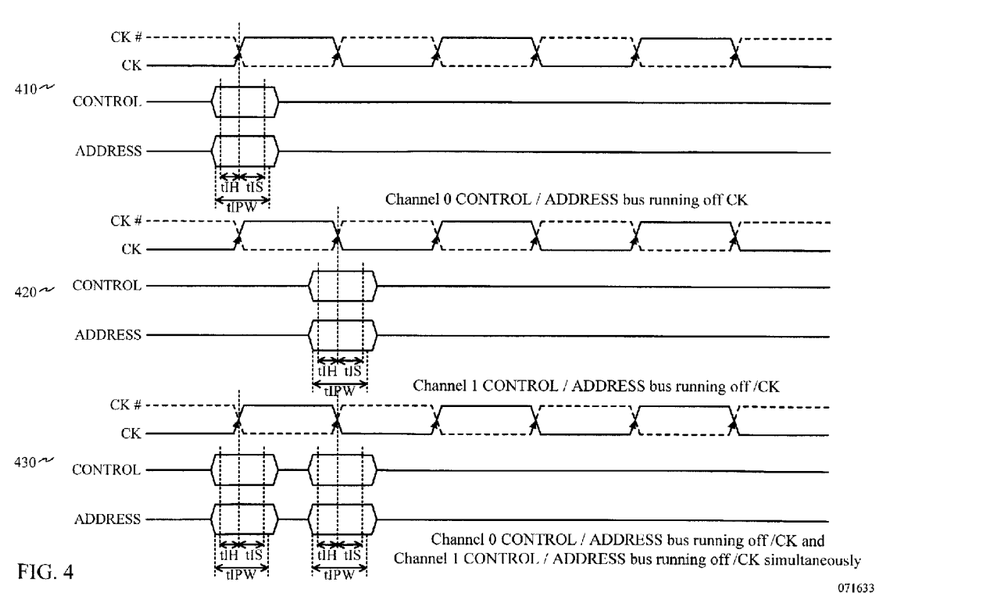
FIG. 4 shows timing diagrams associated with the memory controllers illustrated in FIGS. 1-3.

FIG. 4 shows timing diagrams associated with the memory controllers illustrated in FIGS. 1-3. Timing diagram 410 shows the CK, /CK, and ADDR/CTRL signals for the traditional single channel memory controller architecture 100 show in FIG. 1. As shown in the timing diagrams, tiH may be defined as the address and control input hold time, tiS may be defined as the address and control input setup time, and TIPW may be defined as the address and control input pulse width.

Here, data is transferred over wide data bus 150 at the rising clock transitions. The timing diagrams 420 and 430 correspond to DDR architecture 300. Timing diagram 420 depicts transfers between DDR controller 310 and DDR memory device 320 over narrow data bus 355. During the rising transition of clock signal CK, the shared ADDR/CRTL bus 340 provides addressing information/control information allowing read/write operations to occur. Timing diagram 430 shows transfers between DDR controller 310 and DDR memory device 330 over narrow data bus 350. This occurs at the rising edge of clock signal /CK (which is the falling edge of clock signal CK). At this time, the shared ADDR/CRTL bus 340 provides addressing/control for data transfers to occur. Because the operations of the ADDR/CRTL bus 340 do not overlap in timing diagram 430, the ADDR/CTRL bus 340 operations do not interfere for when data is transferred over the first and second data buses 350 and 355.

If this timing between data transfers over the first and second data channels 350, 355 becomes tight, the clock frequency CK may be lowered to reduce any potential interference over the shared ADDR/CTRL bus 340. This would provide the additional benefit of reducing power consumption in the device.

Figure 5A:
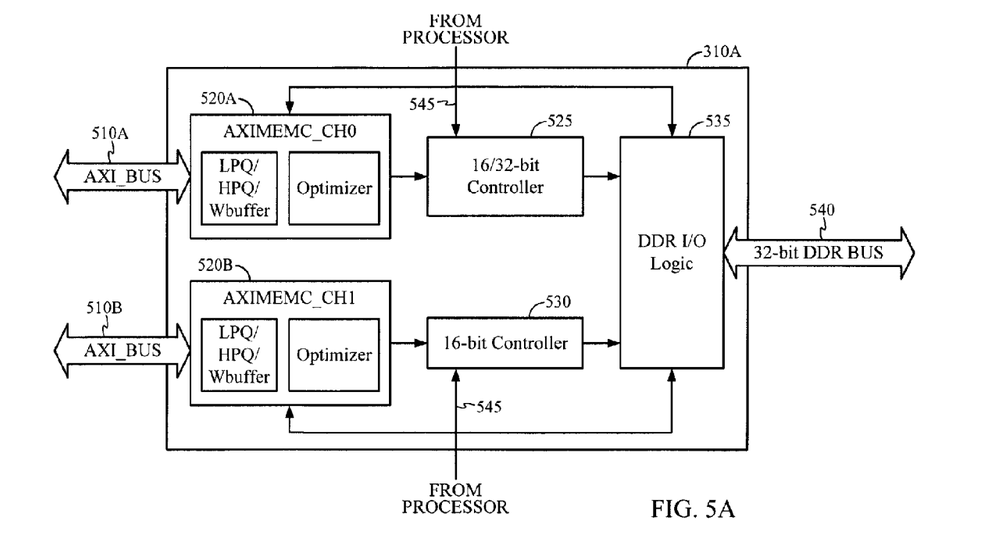
FIGS. 5A and 5B depict block diagrams of exemplary DDR controllers consistent with dual narrow-channel memory architectures.
Figure 5B:
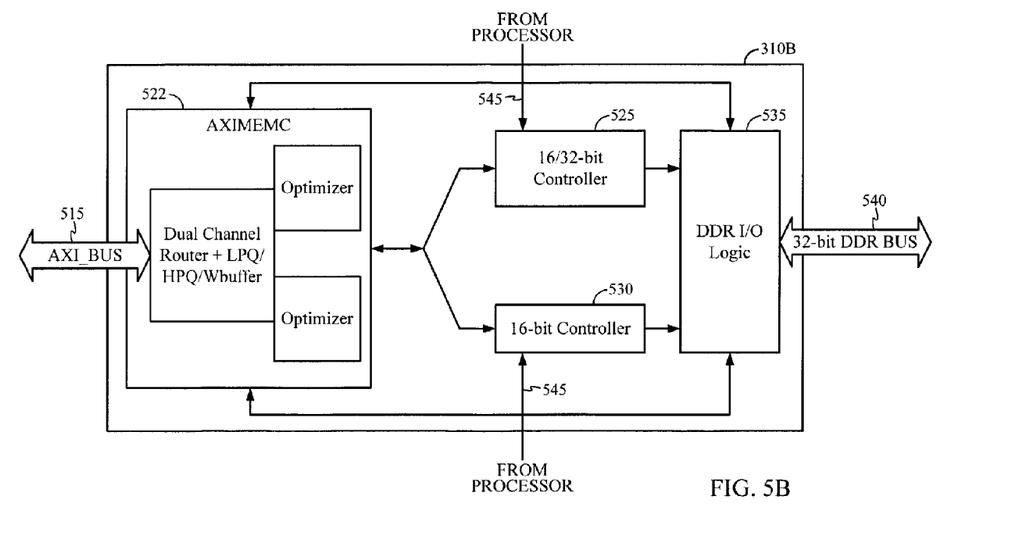

FIG. 5 depicts two exemplary implementations of DDR controllers 310A, B consistent with various embodiments of the invention. In FIG. 5A, the DDR controller 310A may utilize two processor-side buses to route traffic onto two 16-bit memory interface buses. Note that in this embodiment, the two 16-bit buses may be implemented as a single 32-bit bus 540 to maintain backwards compatibility.

Specifically, with this embodiment, the DDR controller 310A may include two Advanced eXtensible Interface (AXI) memory controllers 520A, 520B, a 16/32-bit controller 525, a 16-bit controller 530, and a DDR I/O logic interface 535. Two AXI buses, 510A, 510B, may send and receive data from the AXI memory controllers 520A, 520B, respectively. Within each AXI memory controller, data may be buffered and optimized for subsequent processing. Data from AXI bus 510A is buffered and optimized by AXI memory controller 520A, and then passed on to the 16/32-bit memory controller 525. Data from AXI bus 510B is buffered and optimized by AXI memory controller 520B, and then passed onto 16-bit controller 530.

The AXI memory controllers 520A, 520B may include Low/High priority queues (LPQ, HPQ). The HPQ may be used in the AXI memory controllers 520A, 520B to service masters which have lower latency requirements. All other masters may be serviced through the LPQ. The Wbuffer may be a write buffer intended to capture write transactions to release an AXI bus for other pending transactions. The optimizer in the AXI memory controllers 520A, 520B may re-order transactions from an AXI bus to improve performance.

Data words from the 16/32-bit controller 525 and the 16-bit controller 530 may be formatted by the DDR I/O logic interface 535 to provide two channel 16-bit data bus transfer over the 32-bit DDR bus 540. The embodiment shown in FIG. 5A may have the feature of being a relatively simple implementation of a dual-channel memory interface which can reduce interface pin counts.

In order to retain backward compatibility with existing single data channel hardware, the DDR controller 310A may be capable of an alternative mode of operation which uses a single wide bus (e.g., 32-bit) as a memory interface. This mode is referred to herein as "legacy mode." The mode of the DDR controller 310A may be configured by a processor (not shown) during initialization. During initialization, the processor may configure the DDR controller 310A using a configuration bus 545. The configuration bus 545 may interface with the AXI memory controller 520A, the DDR I/O logic interface 535, the 16/32 bit controller 525, and the 16-bit controller 530 to provide software controlled configuration signals. When operating in legacy mode, the 16-bit controller 530 is disabled, and only 16/32-bit controller 525 remains operational in a 32-bit mode. In legacy mode, only AXI bus 510A and AXI memory controller 520A operate, and AXI bus 510B and AXI memory controller 520B may be turned off.

In FIG. 5B, the DDR controller 310B may use a single processor side bus to route traffic onto two 16-bit memory interface buses. Here, the DDR controller 310B may include one Advanced eXtensible Interface (AXI) memory controller 522, a 16/32-bit controller 525, a 16-bit controller 530, and a DDR I/O logic interface 535. A single AXI buses, 515, may send and receive data from the AXI memory controller 522. Data processed by the AXI memory controller 525 may be split into two channels and forward to the 16/32-bit controller 525 and 16-bit controller 530. Controllers 525 and 530 forward two channels of data onto the DDR I/O logic interface. Data words from the 16/32-bit controller 525 and the 16-bit controller 530 may be formatted by the DDR I/O logic interface 535 to provide two channel 16-bit data bus transfer over the 32-bit DDR bus 540. Within the AXI memory controller 522, data may be routed, buffered, and optimized by a dual channel router/buffer and two optimizers, in order to handle the complexity of routing the data traffic across two channels.

The AXI memory controller 522 may include a Dual Channel Router and Low/High priority queues (LPQ, HPQ). The Dual Channel Router may be used for a single bus implementation of the dual channel scheme to rout the traffic from one channel to two channels. The HPQ may be used in the AXI memory controller 522 to service masters which have lower latency requirements. All other masters may be serviced through the LPQ. The Wbuffer may be a write buffer intended to capture write transactions to release an AXI bus for other pending transactions. The AXI memory controller 522 may include two optimizers fro re-ordering transactions from the AXI bus to improve performance. The AXI memory controller 525 may utilize a protocol which is a single pipelined bus system. Using the single pipeline bus may service both the 16/32 bit Controller 525 and the 16-bit Controller 530 as though they were being interfaced by two separate buses.

As described above for the embodiment shown in FIG. 5A, DDR controller 310B may also operate in a legacy mode to retain backward compatibility with existing single data channel hardware. DDR controller 310B may operate in an alternative mode using a single wide bus (e.g., 32-bit) as a memory interface. As above, the mode of the DDR controller 310B may be configured by a processor (not shown) during initialization using a configuration bus 545. The configuration bus 545 may interface with the AXI memory controller 522, the DDR I/O logic interface 535, the 16/32 bit controller 525, and the 16-bit controller 530 to provide software controlled configuration signals. When operating in legacy mode, the 16-bit controller 530 is disabled, and only 16/32-bit controller 525 remains operational in a 32-bit mode.

Figure 6:
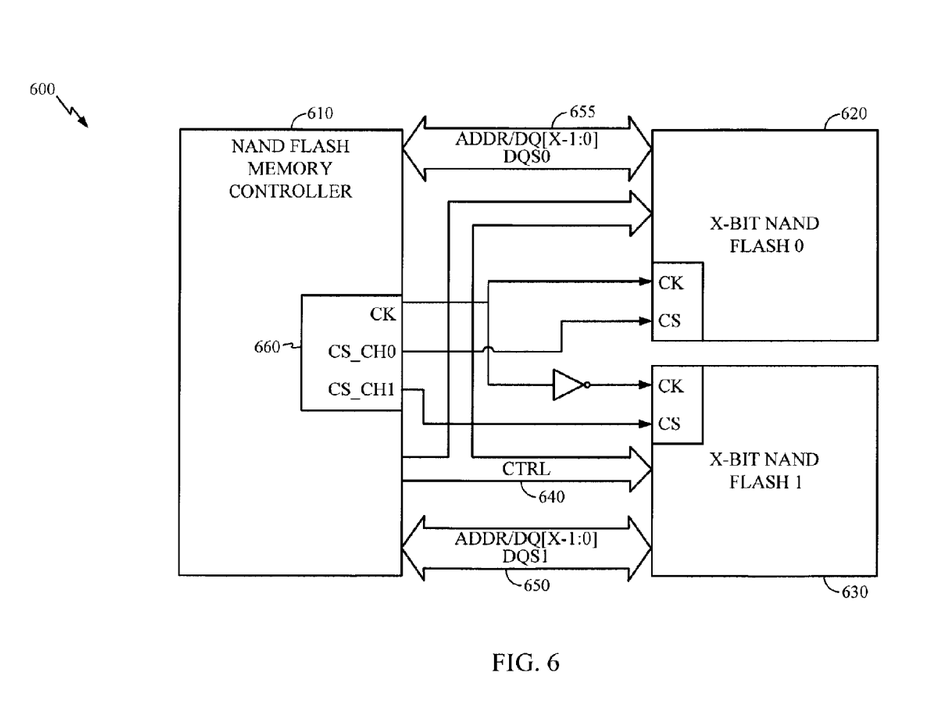
FIG. 6 depicts a block diagram of dual narrow channel NAND memory architecture.

FIG. 6 depicts a block diagram of dual narrow channel NAND memory architecture 600 consistent with an embodiment of the invention which utilizes NAND flash memory. The memory architecture 600 may include a NAND Flash Controller 610, a first X-bit NAND memory device 620, a second X-bit NAND memory device 630, a shared control (CTRL) bus 640, a first address/data bus 650, and a second data bus 355.

With NAND memory architecture 600, the two address/data buses 650 and 655 may be used to transfer both data and addressing information between the NAND controller 610 and each of the X-bit NAND memory devices 620 and 630. In this embodiment, the addressing information and the data are multiplexed using the same set of DQ bus lines. The first bus 650 may be dedicated to both addressing and reading/writing data to/from X-bit NAND memory device 630, and the second bus 655 may be dedicated to both addressing and reading/writing data to/from X-bit NAND memory device 620.

Each narrow data bus 650, 655 may be utilized for transferring both addressing information and data using X separate lines DQ[X−1:0] by time-multiplexing. During write operations to memory, the NAND flash memory controller 610 may multiplex the address and data bits prior to transfer over the address/data buses 650, 655. The addressing and data bits may then be de-multiplexed at the X-Bit NAND memories 620, 630. During read operations from memory, this process is similar; however the flow of data may be reversed. The circuitry for performing the multiplexing/de-multiplexing operations (not shown) may be incorporated into the NAND memory controller and the X-Bit NAND memory devices 620, 630. In another embodiment, the multiplexing/de-multiplexing circuitry may be realized outside of the NAND memory controller 610 and/or the X-Bit NAND flash memory devices 620, 630. The narrow data bus 650, 655 may each also have dedicated lines which carry a separate Data Strobe signals. Bus 655 may utilize Data Strobe signal DQS0, and bus 650 may use Data Strobe signal DQS1. In various embodiments of the invention, the two narrow data buses 650 and 655 may be implemented using a single wide bus. For example, two 16-bit buses may be realized by splitting a 32-bit data bus. In this embodiment, the addressing may operate at a Single Data Rates (SDR), while the data transfer may be Double Data Rate (DDR).

In order to properly address memory within the X-bit NAND memory devices 620, 630, the shared CTRL bus 640 may be used to provide control information from the NAND controller 610 to the NAND memory devices 620, 630. The control signals transferred over the bus may include CLE, ALE, WE_N, RE_N, which are also similar to SDR addressing, thus dual channel concepts described above for DDR memory devices may be applicable to NAND type memory devices.

The address bus may share lines with the data bus for carrying the following addressing signals and bank addressing signals: A[n:0] and BA[m:0]. The control bus may include the following control signals: /RAS, /CAS, and/or /WE.

NAND memory controller 610 also provides a number clock signals to each memory device 620, 630. The NAND Controller 610 provides a single clock signal CK which may be provided directly to X-Bit NAND memory device 620. The CK signal may be inverted to produce the /CK signal, which may be provided to X-Bit NAND memory device 630. This arrangement permits alternating data transfers between the NAND memory controller 610 and the NAND memory devices 620, 630 which occur on both the rising and falling edge of clock signal CK. Various other embodiments of the invention are not limited to using differential signals for CK and /CK. The clock signal CK and /CK have reversed polarity, so the memory devices may be read in an alternate manner. Therefore, the clock signals CK and /CK may be generated accordingly using any conventional technique.

The NAND controller 610 may also provide a first chip select (CS_CH0) to NAND memory device 620, and a second chip select signal (CS_CH1) to NAND memory device 630. The chip select signals may tell the memory devices 620, 630 when to accept/provide data to the NAND controller 610 over first data bus 650 and second data bus 655.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A memory architecture comprising:
a memory controller;
a first memory device coupled to the memory controller by a shared address bus and a first clock signal; and
a second memory device coupled to the memory controller by the shared address bus and a second clock signal, wherein the polarity of the second clock signal is opposite of the polarity of the first clock signal and wherein the shared address bus is configured to provide addressing signals to the first memory device on rising clock transitions of the first clock signal and provide addressing signals to the second memory device on rising clock transitions of the second clock signal.

2. The memory architecture of claim 1, further comprising:
a first narrow bus for transferring data between the first memory device and the memory controller; and
a second narrow bus for transferring data between the second memory device and the memory controller.

3. The memory architecture of claim 2, wherein the first narrow bus and the second narrow bus may be implemented over a single wide data bus.

4. The memory controller of claim 1, wherein the memory controller is capable of being configured to operate over a single wide bus for retaining backwards compatibility.

5. The memory architecture of claim 1, wherein the memory controller directly provides the first clock signal and the second clock signal using differential signaling.

6. The memory architecture of claim 5, wherein the memory controller provides both the first and second clock signals to both the first and second memory devices, and wherein inputs for the first and second clock signals of the second memory device are reversed from inputs of the first memory device to which the first and second clock signals are applied.

7. The memory architecture of claim 1, wherein the memory controller provides the first clock signal to the first memory device and to an inverter, wherein the inverter provides the second clock signal.

8. The memory architecture of claim 1, further comprising:
a shared control bus coupled to the first and second memory devices.

9. The memory architecture of claim 8, wherein the shared control bus and the shared address bus are combined.

10. The memory architecture of claim 8, wherein at least one of the shared address bus and the shared control bus consolidates the number of pins required to interface the memory controller to the first and second memory devices.

11. The memory architecture of claim 1, wherein the memory devices are one of DDR memory devices or Low Power DDR (LPDDR) devices.

12. The memory architecture of claim 11, wherein the first and second memory devices are comprised of 16-bit devices, the first narrow bus comprises a 16-bit bus width and the second narrow bus includes a 16-bit bus width, and the address bus comprises a 16 bit bus.

13. A method for performing data transactions, comprising:
providing addressing signals over a shared address bus to a first memory device and a second memory device;
providing a first clock signal and a second clock signal to the first memory device and the second memory device respectively, wherein the clock signals are derived from a common clock signal and the shared address bus is configured to provide the addressing signals to the first memory device on rising clock transitions of the first clock signal and provide the addressing signals to the second memory device on rising clock transitions of the second clock signal; and
transferring data to the memory devices over separate narrow data buses in an alternating manner based upon the first and second clock signals, wherein the separate narrow data buses are configurable as either a combined single wide data bus or as independent narrow data buses.

14. The method of claim 13
wherein the polarity of the second clock signal is opposite of the polarity of the first clock signal.

15. The method of claim 14, further comprising:
providing the first clock signal and the second clock signal using differential signaling.

16. The method of claim 13, further comprising:
providing both the first and second clock signals to both the first and second memory devices, and wherein inputs for the first and second clock signals of the second memory device are reversed from inputs of the first memory device to which the first and second clock signals are applied.

17. The method of claim 13, further comprising:
providing the first clock signal to the first memory device and to an inverter, and wherein the inverter provides the second clock signal.

18. The method of claim 13, further comprising:
providing control signals over a shared control bus to the first and second memory devices.

19. The method of claim 18, wherein the address bus and control bus are a combined bus.

20. The method of claim 13, further comprising:
consolidating the number of pins required to interface the memory controller to the first and second memory devices.

21. A DDR memory architecture comprising:
a means for providing addressing signals over a shared address bus to a first memory device and a second memory device;
a means for providing a first clock signal and a second clock signal to the first memory device and the second memory device respectively, wherein the clock signals are derived from a common clock signal and the shared address bus is configured to provide the addressing signals to the first memory device on rising clock transitions of the first clock signal and provide the addressing signals to the second memory device on rising clock transitions of the second clock signal; and
a means for transferring data to the memory devices over separate narrow data buses in an alternating manner based upon the first and second clock signals wherein the separate narrow data buses are configurable as either a combined single wide data bus or as independent narrow data buses.

22. The DDR memory architecture of claim 21, wherein the polarity of the second clock signal is opposite of the polarity of the first clock signal.

23. The DDR memory architecture of claim 22, further comprising:
a means for providing the first clock signal and the second clock signal using differential signaling.

24. The DDR memory architecture of claim 21, further comprising:
a means for providing both the first and second clock signals to both the first and second memory devices, further wherein inputs for the first and second clock signals of the second memory device are reversed from inputs of the first memory device to which the first and second clock signals are applied.

25. The DDR memory architecture of claim 21, further comprising:
a means for providing the first clock signal to the first memory device and to an inverter, further wherein the inverted first clock signal produces the second clock signal.

* * * * *